Feb. 24, 1953 — L. V. SCHAAR — 2,629,315

FOOD COOKING APPARATUS

Filed Sept. 26, 1950 — 3 Sheets-Sheet 1

INVENTOR.
LIVINGSTON V. SCHAAR
BY McMorrow, Berman & Davidson
ATTORNEYS

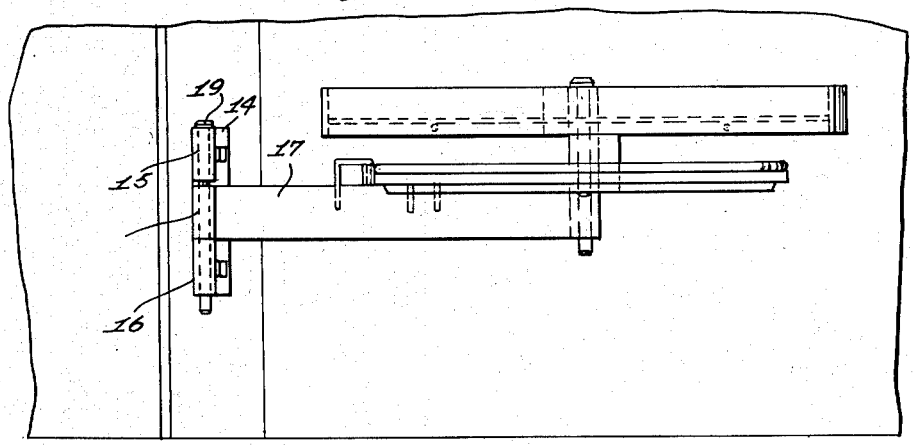
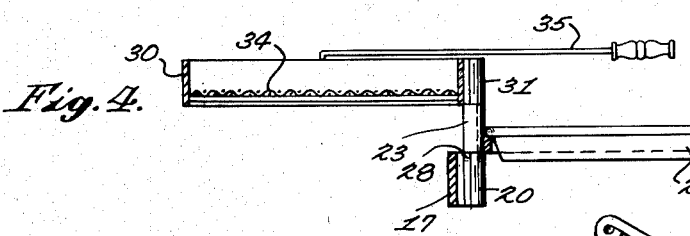
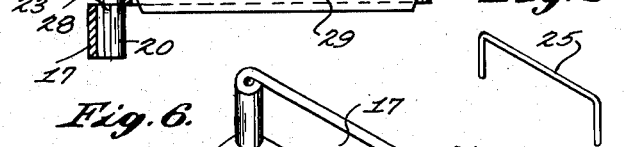
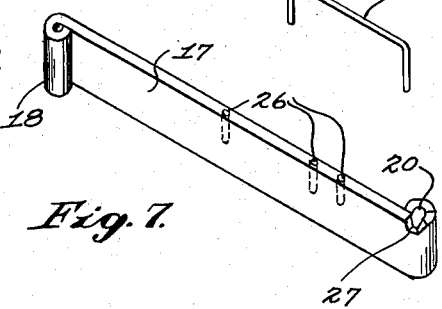
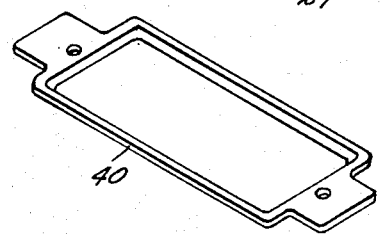
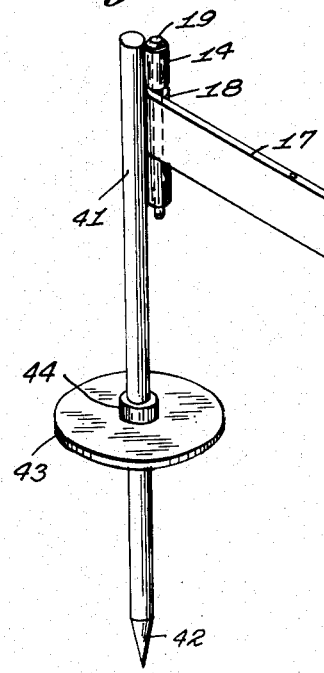
INVENTOR.
LIVINGSTON V. SCHAAR
BY
McMorrow, Berman + Davidson
ATTORNEYS Feb. 24, 1953
L. V. SCHAAR
2,629,315
FOOD COOKING APPARATUS
Filed Sept. 26, 1950
3 Sheets-Sheet 3
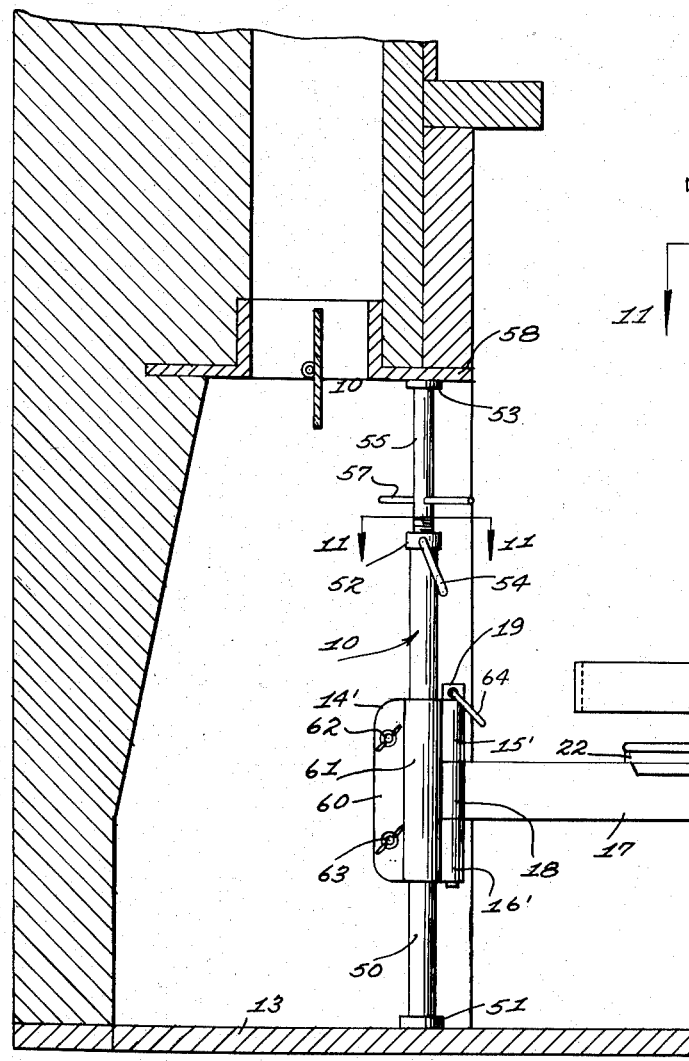
INVENTOR.
LIVINGSTON V. SCHAAR
BY
McMorrow, Berman + Davidson
ATTORNEYS Patented Feb. 24, 1953

2,629,315

UNITED STATES PATENT OFFICE 2,629,315

FOOD COOKING APPARATUS

Livingston V. Schaar, Lake Orion, Mich.

Application September 26, 1950, Serial No. 186,827

5 Claims. (Cl. 99—446)

This invention relates to food cooking apparatus and more particularly to apparatus for cooking food over an open fire, either in a fireplace or out of doors.

It is among the objects of the invention to provide food cooking apparatus which is effective to firmly support a food cooking receptacle and a drip pan or serving tray in proper relationship to an open fire and permit free movement of the receptacle and the pan or tray toward and away from the fire and free movement of the receptacle and pan or tray relative to each other, which apparatus is readily portable and can be reduced to compact form for convenient transportation or storage and easily assembled for use, which will support a cooking receptacle, such as a broiler, griddle or pan, for movement toward and away from a location directly above a cooking fire and will support a drip pan or tray for movement toward and away from a position in which it is disposed directly below the cooking receptacle, which may include mounting means to be permanently attached to a fireplace or similar structure, if desired, or with portable mounting means engageable in a fireplace or insertable into the ground, which is fully adjustable for different operating conditions, and which is simple and durable in construction, economical to manufacture, and neat and attractive in appearance.

Other objects and advantages will become apparent from a consideration of the following description and the appended claims in conjunction with the accompanying drawings wherein:

Figure 3 is a front elevational view of the food cooking apparatus illustrated in Figure 1 with a fragmentary portion of the fireplace included;

Figure 4 is a transverse cross sectional view of the food cooking apparatus taken on the line 4—4 of Figure 2;

Figure 5 is a perspective view of a wire brace for releasably locking two parts of the cooking apparatus against relative movement;

Figure 6 is a perspective view of a crane arm constituting an operative component of the apparatus;

Figure 7 is a perspective view of a griddle which may constitute an operative component of the apparatus;

Figure 8 is a perspective view of a portion of the apparatus showing a modified form thereof;

Figure 9 is a substantially vertical cross sectional view of a fireplace showing in elevation a further modified form of the food cooking apparatus operatively mounted in the fireplace;

Figure 10 is a fragmentary cross sectional view on the line 10—10 of Figure 9; and Figure 11 is a transverse cross sectional view on the line 11—11 of Figure 9.

Figure 1:
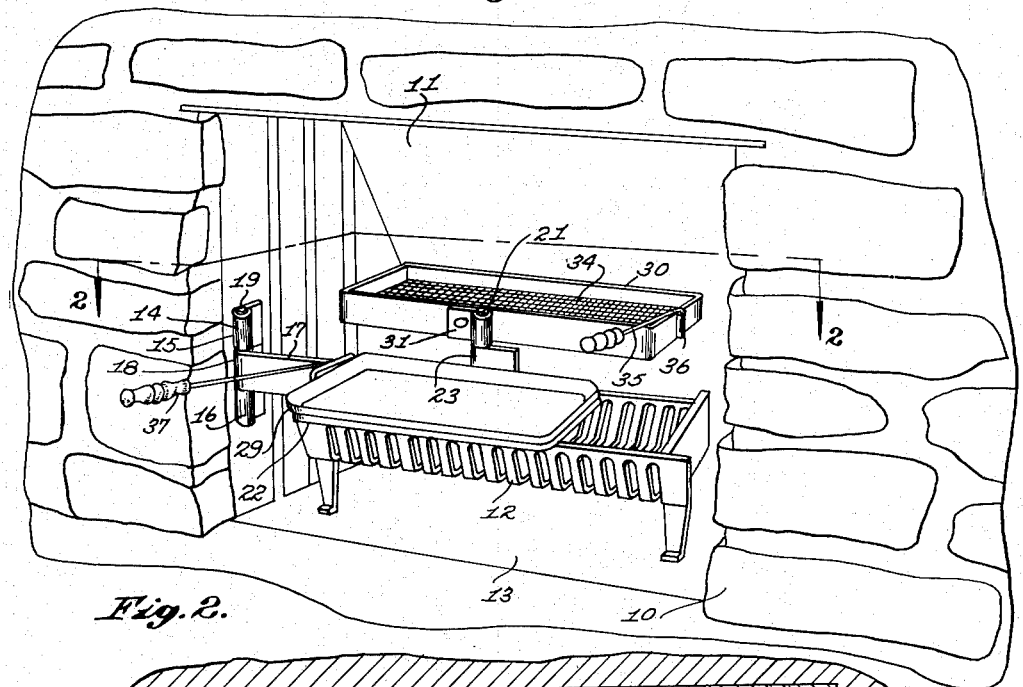
Figure 1 is a perspective view of a fireplace and basket type grate with food cooking apparatus illustrative of the invention operatively mounted in the fireplace.

With continued reference to the drawings, the fireplace assembly illustrated in Figure 1 includes a fireplace wall 10 having a fireplace opening or cavity 11 therein and a basket type grate 12 supported on the floor 13 of the fireplace for burning charcoal or other fuel.

As the fireplace and grate may be of any desired or well known construction, a detailed description thereof is considered unnecessary for the purposes of the present disclosure.

The food cooking apparatus of the invention comprises, in the form illustrated in Figures 1 to 6 inclusive, a hinge butt 14 secured to one wall of the fireplace adjacent the front opening of the fireplace and at a predetermined height relative to the top of the grate 12. This hinge butt has two spaced apart, cylindrical eyes 15 and 16 the bores of which are in registry with each other, and an elongated crane arm 17 has at one end a cylindrical eye formation 18 disposed between the eyes 15 and 16 of the hinge butt 14. A hinge pin 19 extends through the eyes 15, 16 and 18 and is substantially vertically disposed to support the crane arm 17 for swinging movements about a substantially vertical axis.

A cylindrical eye formation 20 is provided at the other end of the crane arm 17 and a hinge pin 21 is received at its lower end in the eye formation 20 and projects upwardly therefrom in substantially vertical position with its axis substantially parallel to the axis of the hinge pin 19.

A hollow, rectangular frame 22 has on one side a hinge butt 23 the eye of which receives the hinge pin 21 and the lower end of which rests upon the upper end of the eye formation 20 on the crane arm 17. The hinge butt 23 is located adjacent the mid-length location of one of the longer sides of the frame 22 and supports the frame substantially perpendicular to the axis of the pin 21.

Figure 2:
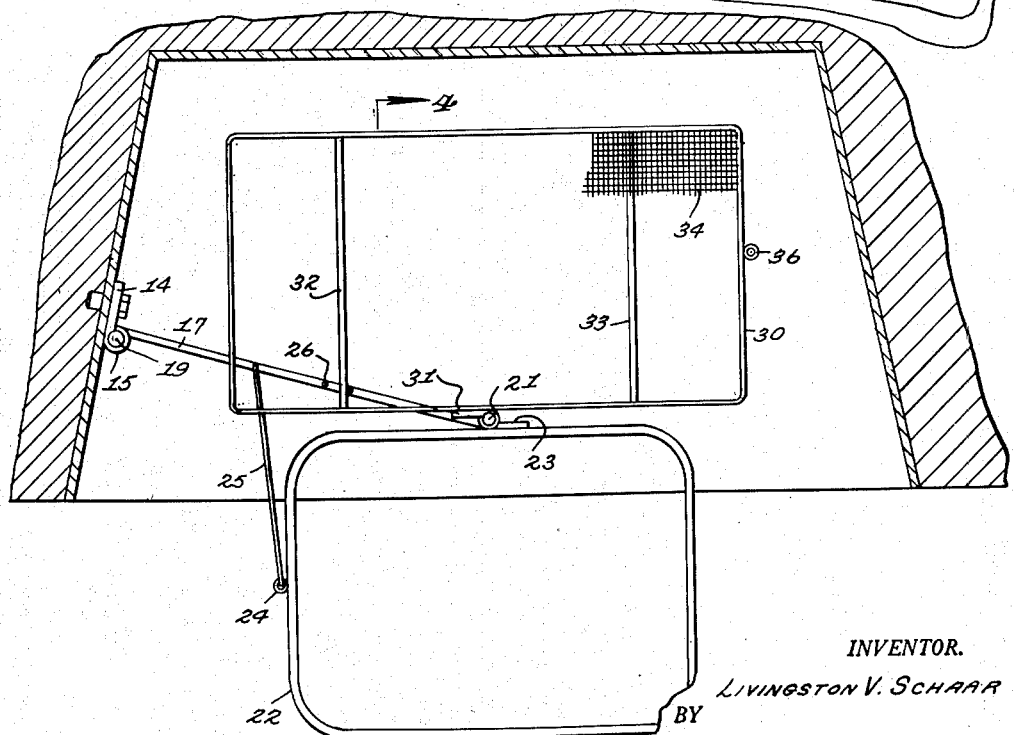
Figure 2 is a cross sectional view substantially on the line 2—2 of Figure 1.

In the form of the invention illustrated in Figures 1 and 2, an eye 24 is provided on one end of the frame 22 and an elongated wire brace or hook 25 having a perpendicularly disposed portion at each end has one end portion received in the eye 24 and its other end portion engaged in a selected one of a series of apertures 26 provided in the top edge of the crane arm 17 to releasably hold the frame 22 against rotational movement to the crane arm.

As is particularly illustrated in Figure 6, instead of the hook 25 being used to hold the frame 22 in a predetermined position relative to the crane arm, the eye formation 20 on the crane arm is provided in its upper edge with a notch 27 having inclined sides and the hinge butt 23 is provided on its bottom edge with a tongue 28 releasably engageable in the notch 27 to releasably hold the frame 22 in a predetermined position relative to the crane arm.

The frame 22 is particularly adapted to hold a shallow drip pan 29, particularly illustrated in Figures 1 and 4, and when the frame with the pan therein is held by the hook 25 or by the tongue 28 engaging in the notch 27, in the position illustrated in Figures 1 and 2, this drip pan may be used as a serving or cutting tray as will later be described in further detail.

A second frame 30 of elongated, rectangular shape has a hinge butt 31 secured to one of its longer sides substantially at the mid-length location of such side and receiving the hinge pin 21 above the hinge butt 23 on the frame 22.

The frame 30 has two struts or battens 32 and 33 extending transversely thereacross spaced from and substantially parallel to the respectively opposite ends of the frame.

The second frame 30 is supported by the hinge butt 31 substantially perpendicular to the axis of the hinge pin 21 and the struts 32 and 33 may be used to support a broiling grid 34. When the frame 30 is positioned directly over the grate, as illustrated in Figure 1, the drip pan 29 is disposed at the front side of the fireplace where it can be conveniently used as a serving tray. If the crane arm is swung to move the broiling grid away from the fire, the pan 29 may be swung under the broiling grid to catch the drippings from the grid. Also, when desired, the frame 30 can be swung about the pivotal axis of the pin 21 to bring it above the drip pan 29. The frame 30 is swung about the pin 21 by a handle 35 releasably engaged at one end in an eye 36 provided on one end of the frame and the frame 22 can be swung about the pin 21 by a handle 37 engaged at one end in the eye 24 when the hook 25 is removed from this eye.

If desired, the grid 34 can be removed from the frame 30 and a griddle 40, particularly illustrated in Figure 7, placed in the frame for cooking such articles of food as hot cakes, eggs or potatoes.

In the arrangement illustrated in Figure 8, the apparatus is adapted for cooking over an open fire out of doors. In this case, the hinge butt 14, instead of being secured to the wall of a fireplace, is secured to a metal stake 41, near one end of the stake. The other end of the stake is pointed, as indicated at 42, for insertion into the ground and a ground engaging plate 43 has an aperture therein receiving the stake 41 and is positioned intermediate the length of the stake. Preferably, the plate 43 is circular and has a hollow boss 44 surrounding a central, stake receiving aperture therein and suitable means, such as a set screw, extends through the boss and engages the stake to lock the plate in adjusted position along the stake. After the stake has been driven into the ground in upright position, the plate 43 is placed against the surface of the ground and locked in position to assist in supporting the stake in the upright position necessary to properly support the food cooking equipment.

In the modified arrangement illustrated in Figures 9, 10 and 11 a longitudinally adjustable strut is used to mount the apparatus in a fireplace and the crane hinge is adjustably mounted on this strut.

As illustrated in detail in the above mentioned figures, a tubular post 50 has on one end a footplate 51 adapted to rest on the floor 13 of the fireplace and a nut 52 is mounted in the other end of the post. This nut has on one end an integral collar providing an annular shoulder 53 which rests upon the corresponding end of the post to support the nut. A rectangular handle 54 is pivotally connected at its ends to the nut 52 so that the nut can be conveniently held against rotation.

A tubular screw shaft 55 is threaded through the nut 52 and has on one end a pivotally mounted headplate 56. Intermediate its length the screw shaft 55 is provided with diametrically opposed apertures and a turning bar 57 extends through these apertures for rotating the screw shaft relative to the nut 52.

With this arrangement, the strut may be placed in a fireplace near the open side of the latter with the footplate 51 resting upon the floor of the fireplace and, with the handle 54 held in one hand to prevent rotation of the nut 52, the screw shaft 55 may be rotated by the other hand through the intermediacy of the bar 57 until the headplate 56 is brought into firm engagement with the lintle 58 of the fireplace.

The modified hinge butt 14' is provided with two clamp plates, one of which is shown at 60 in Figure 9. These clamp plates have semicylindrical formations 61 extending longitudinally thereof intermediate their width and these two formations together constitute a sleeve which slidably receives the post 50. The two cylindrical eyes 15' and 16' are provided at one side of the sleeve formation and at the opposite side of the sleeve formation the clamp plates are provided with two pair of registering apertures and screws 62 and 63 extend through these apertures at spaced apart locations longitudinally of the clamp plates. Wing nuts are threaded one onto each of these screws to clamp the hinge butt 14' in adjusted position longitudinally of the post 50. With this arrangement, the height of the frames 22 and 30 above the fire can be adjusted as may be desired.

In the modified arrangement shown in Figures 9, 10 and 11 the hinge pins 19 and 21 are each provided near its upper end with a transverse aperture and a ring 64 extends through the aperture in the pin 19 while a similar ring 65 extends through the aperture in the pin 21, these rings facilitating removal of the pins from the associated hinge butts and assembly of the pins with the hinge butts to facilitate assembly and disassembly of the apparatus.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. Apparatus for cooking food over an open fire comprising a support, a hinge butt mounted on said support and having vertically spaced apart cylindrical eye formations, an elongated crane arm having cylindrical eye formations disposed one at each end thereof with their longitudinal center lines substantially perpendicular to the longitudinal center line of said arm, one of the eye formations on said arm being disposed between the eye formations on said hinge butt, a first hinge pin extending through the eye formations on said hinge butt and said one eye formation on said arm pivotally connecting said arm to said hinge butt for swinging movements about a substantially vertical axis, a second hinge pin mounted in the other eye formation on said arm and extending upwardly therefrom, a first frame having thereon a hinge butt including an eye formation receiving said second hinge pin and resting on the upper end of the associated eye formation on said arm supporting said first frame in substantially horizontal position, a second frame having thereon a hinge butt provided with an eye formation receiving said second hinge pin and resting on the hinge butt of said first frame supporting said second frame in substantially horizontal position, and a grille carried by one and a pan carried by the other of said frames.

2. Apparatus for cooking food over an open fire comprising a support, a hinge butt mounted on said support and having vertically spaced apart cylindrical eye formations, an elongated crane arm having cylindrical eye formations disposed one at each end thereof with their longitudinal center lines substantially perpendicular to the longitudinal center line of said arm, one of the eye formations on said arm being disposed between the eye formations on said hinge butt, a first hinge pin extending through the eye formations on said hinge butt and said one eye formation on said arm pivotally connecting said arm to said hinge butt for swinging movement of said arm about a substantially vertical axis, a second hinge pin mounted in the other eye formation on said arm and projecting upwardly therefrom, a first frame having thereon a hinge butt provided with an eye formation receiving said second hinge pin and resting on the upper end of the associated eye formation on said arm to support said first frame in substantially horizontal position, a second frame having thereon a hinge butt provided with an eye formation receiving said second hinge pin and resting on the hinge butt of said first frame to support said second frame in substantially horizontal position, a grille carried by said second frame, and a drip pan carried by said first frame and movable under said grille.

3. Apparatus for cooking food over an open fire comprising a support, a hinge butt mounted on said support and having vertically spaced apart cylindrical eye formations, an elongated crane arm having cylindrical eye formations disposed one at each end thereof with their longitudinal center lines substantially perpendicular to the longitudinal center line of said arm, one of the eye formations on said arm being disposed between the eye formations on said hinge butt, a first hinge pin extending through the eye formations on said hinge butt and said one eye formation on said arm pivotally connecting said arm to said hinge butt for swinging movement of said arm about a substantially vertical axis, a second hinge pin mounted in the other eye formation on said arm and projecting upwardly therefrom, a first frame having thereon a hinge butt provided with an eye formation receiving said second hinge pin and resting on the upper end of the associated eye formation on said arm to support said first frame in substantially horizontal position, a second frame having thereon a hinge butt provided with an eye formation receiving said second hinge pin and resting on the hinge butt of said first frame to support said second frame in substantially horizontal position, a grille carried by said second frame, and a drip pan carried by said first frame and movable under said grille, said support comprising a stake having one end spaced from said hinge butt and pointed for insertion into the ground, and a ground engaging plate slidably mounted on said stake.

4. Apparatus for cooking food over an open fire comprising a support, a hinge butt mounted on said support and having vertically spaced apart cylindrical eye formations, an elongated crane arm having cylindrical eye formations disposed one at each end thereof with their longitudinal center lines substantially perpendicular to the longitudinal center line of said arm, one of the eye formations on said arm being disposed between the eye formations on said hinge butt, a first hinge pin extending through the eye formations on said hinge butt and said one eye formation on said arm pivotally connecting said arm to said hinge butt for swinging movement of said arm about a substantially vertical axis, a second hinge pin mounted in the other eye formation on said arm and projecting upwardly therefrom, a first frame having thereon a hinge butt provided with an eye formation receiving said second hinge pin and resting on the upper end of the associated eye formation on said arm to support said first frame in substantially horizontal position, a second frame having thereon a hinge butt provided with an eye formation receiving said second hinge pin and resting on the hinge butt of said first frame to support said second frame in substantially horizontal position, a grille carried by said second frame, and a drip pan carried by said first frame and movable under said grille, said support comprising an adjustable length strut secured intermediate its length to said hinge butt and engageable at its end between the upper and lower surfaces of a fireplace opening.

5. Apparatus for cooking food over an open fire comprising a support, a hinge butt mounted on said support and having vertically spaced apart cylindrical eye formations, an elongated crane arm having cylindrical eye formations disposed one at each end thereof with their longitudinal center lines substantially perpendicular to the longitudinal center line of said arm, one of the eye formations on said arm being disposed between the eye formations on said hinge butt, a first hinge pin extending through the eye formations on said hinge butt on said one eye formation on said arm pivotally connecting said arm to said hinge butt for swinging movement of said arm about a substantially vertical axis, a second hinge pin mounted in the other eye formation on said arm and projecting upwardly therefrom, a first frame having thereon a hinge butt provided with an eye formation receiving said second hinge pin and resting on the upper end of the associated eye formation on said arm to support said first frame in substantially horizontal position, a second frame having thereon a hinge butt provided with an eye formation receiving said second hinge pin and resting on the hinge butt of said first frame to support said second frame in substantially horizontal position, a grille carried by said second frame, and a drip pan carried by said first frame and movable under said grille, said support comprising an adjustable length strut disposed adjacent the first-mentioned hinge butt and engageable at its ends between the upper and lower surfaces of a fireplace opening to support said first-mentioned hinge butt with the axes of said first and second hinge pins substantially vertically disposed, and a clamp on said first-mentioned hinge butt slidably receiving said strut to secure said first-mentioned hinge butt to said strut with said frame at selected positions of adjustment above the lower surface of the fireplace opening.

LIVINGSTON V. SCHAAR.

REFERENCES CITED

The following references are of record in the file of this patent:

UNITED STATES PATENTS

| Number | Name | Date |
| --- | --- | --- |
| 134,751 | Jones | Jan. 14, 1873 |
| 365,859 | Porter | July 5, 1887 |
| 480,261 | Herr | Aug. 9, 1892 |
| 531,257 | Bond | Dec. 18, 1894 |
| 768,051 | Johnson | Aug. 23, 1904 |
| 963,030 | Balch | July 5, 1910 |
| 1,060,795 | Smith | May 6, 1913 |
| 1,711,426 | Radvany | Apr. 30, 1929 |
| 2,174,435 | Bayter | Sept. 26, 1939 |
| 2,488,898 | Brasty | Nov. 22, 1949 |
| 2,506,698 | Beals | May 9, 1950 |